UNITED STATES PATENT OFFICE.

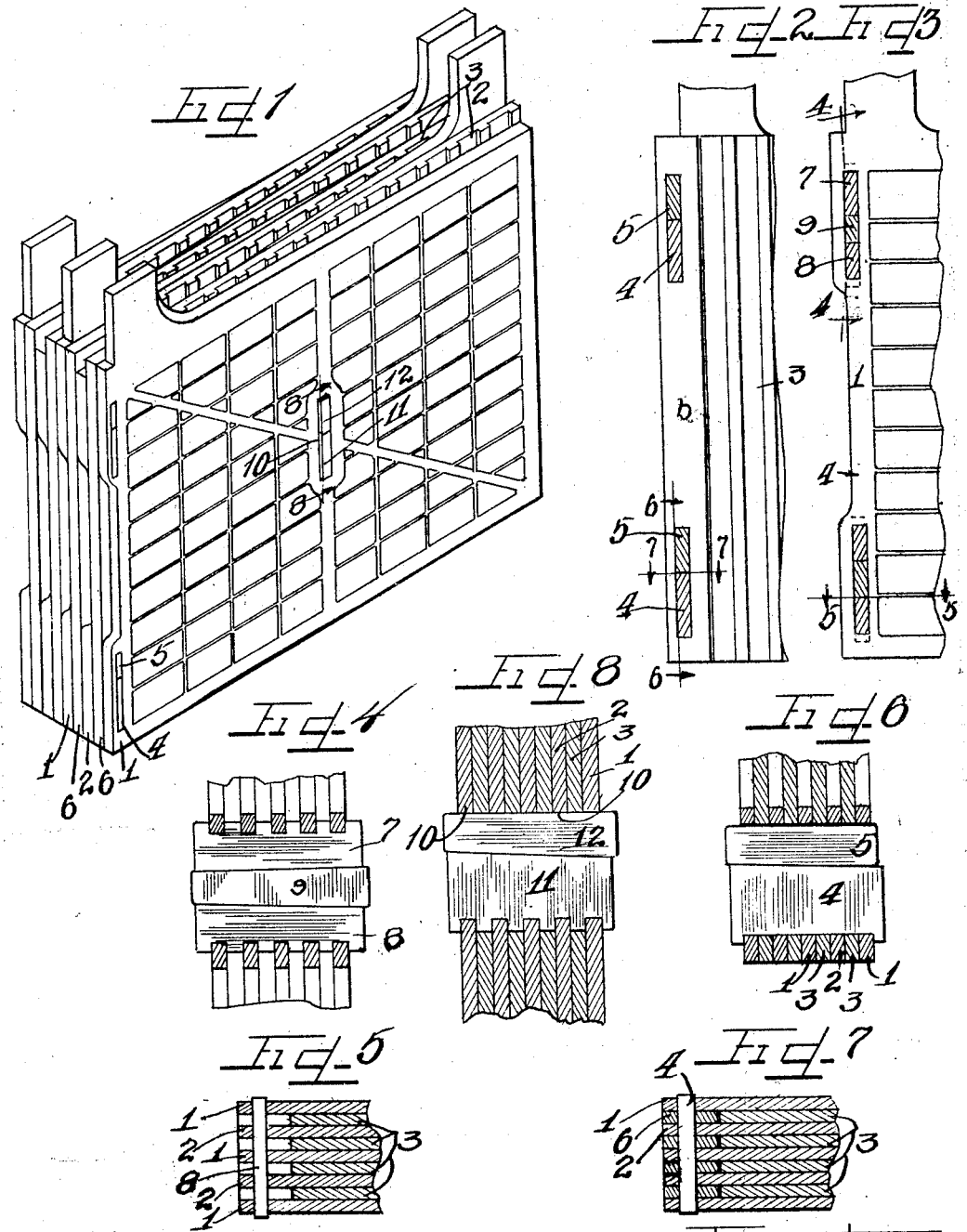

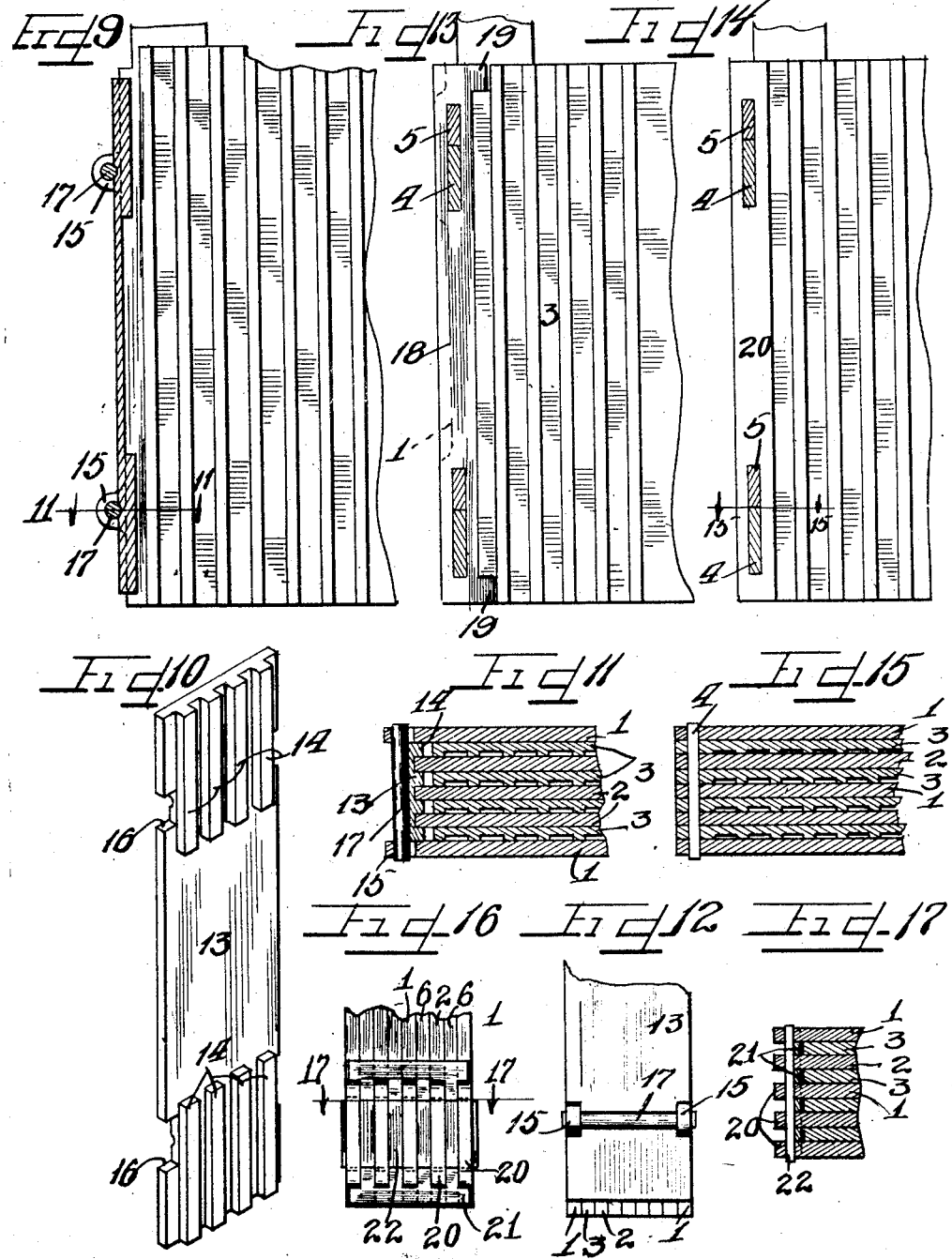

LEE J. PERRY, OF CHICAGO, ILLINOIS, ASSIGNOR TO VESTA ACCUMULATOR COMPANY, OF CHICAGO, ILLINOIS, A CORPORATION OF ILLINOIS.

STORAGE-BATTERY CELL.

1,325,653.

Specification of Letters Patent. Patented Dec. 23, 1919.

Application filed March 10, 1916. Serial No. 83,345.

*To all whom it may concern:*

Be it known that I, LEE J. PERRY, a citizen of the United States, and a resident of the city of Chicago, in the county of Cook and State of Illinois, have invented certain new and useful Improvements in Storage-Battery Cells; and I do hereby declare that the following is a full, clear, and exact description of the same, reference being had to the accompanying drawings, and to the numerals of reference marked thereon, which form a part of this specification.

Storage cells used on motor-cars or other moving vehicles are subjected to extremely hard usage, and shocks and vibrations when transmitted to a storage cell tend to shorten the life thereof. This is due to the fact that a storage cell of the lead plate type with the active material pressed into the grid plates is a more or less delicate construction and slight damage to the grid plates may result in irreparable injury to the cell.

This invention relates to an improved battery cell construction wherein mechanical means is provided for positively interlocking the cell plates one to another to resist relative movement thereof or chafing of the plates on the insulating separator mats provided, so that a substantially unitary and rigid combination of elements is afforded which is capable of resisting damaging mechanical stresses imposed thereon.

It is an object therefore of this invention to construct an accumulator cell wherein the elements of the construction are so designed as to provide for the use of a novel interlocking and spacing means for the plates of the cell, so that the same are held as a rigid unit and yet the cell is easily assembled or dismantled when desired.

It is also an object of this invention to construct an accumulator cell wherein the plates are designed to coact with interlocking means which hold the plates properly associated with one another in rigid relation to prevent chafing of the parts and yet maintain the same in spaced insulated relation.

It is also an important object of this invention to construct an accumulator cell wherein means are formed on the ends, and if desired centrally, of the respective plates of the cell to receive engaged therewith easily removable interlocking means which co-act with insulating elements to interlock the plates one to another in spaced insulated relation and further acting to prevent buckling or warping of the plates at the points of support thereof.

It is furthermore an important object of this invention to construct an accumulator cell wherein the plates of the cell are constructed to receive detachably connected thereon insulating locking devices for locking the plates one to another in spaced relation, co-acting with insulating separating means placed between the plates for the purpose.

It is also an object of this invention to construct a simple and improved type of rigid plate accumulator cell constructed to afford easy assembly and dismantling of the cell.

The invention (in a preferred form) is illustrated in the drawings and hereinafter more fully described.

In the drawings:

Figure 1 is a perspective view of a number of accumulator cell plates assembled and insulated from one another according to the principles of my invention.

Fig. 2 is a fragmentary end view of one of the plates of the cell, showing interlocking means in section.

Fig. 3 is a similar view illustrating insulating interlocking means of another form between the cell plates.

Fig. 4 is a fragmentary detail section taken on line 4—4 of Fig. 3.

Fig. 5 is a fragmentary detail section taken on line 5—5 of Fig. 3.

Fig. 6 is a fragmentary detail section taken on line 6—6 of Fig. 2.

Fig. 7 is a fragmentary detail section taken on line 7—7 of Fig. 2.

Fig. 8 is a sectional detail taken on line 8—8 of Fig. 1.

Fig. 9 is a view similar to Fig. 3, showing a modified form of construction.

Fig. 10 is an interior perspective view of the end insulator plate which is shown in section in Fig. 9.

Fig. 11 is a section on line 11—11 of Fig. 9.

Fig. 12 is a fragmentary exterior end view at the lower end of the construction shown in Fig. 9.

Fig. 13 is a view similar to Fig. 9, of another form of construction.

Fig. 14 is a similar view of still another form of structure.

Fig. 15 is a fragmentary detail section taken on line 15—15 of Fig. 14.

Fig. 16 is a fragmentary exterior view of the lower end of a modified form of device.

Fig. 17 is a fragmentary section on line 17—17 of Fig. 16.

As shown in the drawings:

The cell plates are denoted respectively by the reference numerals 1 and 2, arranged in alternate spaced relation, and provided therebetween with insulating separator mats 3, of substantially the same area as the cell plates. Each of said respective cell plates at the upper and lower portions of the ends thereof is extended and provided with a slot, and through the registering slots of said cell plates are inserted trapezoidal retaining plates 4, the ends of each of which project over the outer surfaces of the respective outer cell plates 1, as clearly shown in Fig. 6, held wedged therein by other trapezoidal or wedge shaped plates 5, driven into place after the plates 4, have been inserted into place. Inserted between the enlarged metal extensions of the respective cell plates are long upright insulator separator strips 6, which are provided with slots at the upper and lower ends thereof adapted to be disposed in register with the slots of the cell plates, so that the interlocking members 4 and 5, extend therethrough, as clearly shown in the sectional views of Figs. 2 and 6.

In the modified device illustrated in Figs. 3 and 4, in place of two locking members 4 and 5, I have shown three members comprising an upper trapezoidal bar or plate 7, notched and engaged with the ends of the slots in the extensions of the cell plates, and a similar lower notched member 8, with a wedge member 9, driven therebetween after said members 7 and 8, are in place to hold the same rigidly in position.

The associated plates 1 and 2, and separator mats 3, may also be rigidly locked to one another centrally thereof if so desired, and for this purpose slots 10, are provided in each of the cell plates registering with similar slots in the separator mats 3, and inserted through said registering slots is a notched trapezoidal locking bar or plate member 11, adapted to be wedged tightly in place by a small wedge bar member 12.

In the form of construction illustrated in Figs. 9, 10, 11, and 12, I have shown an insulating end plate member 13, having a plurality of ribs 14, thereon, at the upper and lower ends thereof, adapting the plates to be fitted over the ends of the assembled grid plates, with the ribs 14, inserted therebetween. The outermost or exterior cell plates 1, of the assembled groups, are each provided with apertured lugs or ears 15, at the upper and lower ends thereof, which project through notches 16, provided therefor in the end plate 13, and are adapted to receive inserted through their apertures retaining pins 17, whereby the end plates 13, are held rigidly in place. The outer surface of the end plates 13, at the points of contact with the pins 17, is grooved a slight amount so as to lock said end plates 13, from longitudinal movements.

In Fig. 13 I have shown a slightly modified construction which is very similar to the construction shown in Figs. 1 and 2, with the exception that the separator strips 6, are replaced by strips 18, the upper and lower ends of which at their inner edges are provided with inwardly projecting tongues or projections 19, adapted to engage into notches cut in the corners of the separator mats 3, to thereby lock the same from movement.

In the construction illustrated in Figs. 14 and 15, I have shown separator mats 20, which extend at each end to the extreme ends of the cell plates and are slotted in register therewith to receive the locking members 4 and 5, therethrough, so that the separator mats, as well as the cell plates, are locked from movement, so that the entire construction is rigidly and securely locked in assembled relation.

The form of interlocking means shown in Figs. 16 and 17, necessitates the formation on the ends of the grid plates of extended slotted lugs 20, and fitted therebetween flat against the ends of the associated grid plates 1 and 2, and the separators 3, is a ladder shaped insulating plate 21. Inserted through the slotted lugs 20, and disposed over the exterior surface of the ladder shaped plate 21, is an insulating flat locking bar or key 22, which may be tapered if so desired to permit wedging the same in engagement with the slotted lugs 20, to hold the spacing ladder plate in place.

The operation of the various constructions shown and described is believed to be obvious from the description. The purpose in each case is to lock the assembly of cell plates and separator mats or insulating elements rigidly one to another substantially as a unit, so that no relative movement or chafing between the parts or warping or buckling of the elements can take place, due to the shocks, vibrations and other effects due to severe usage, such as is imposed upon the cell when used on a motor car.

I am aware that various details of construction may be varied through a wide range without departing from the principles of this invention, and I therefore do not purpose limiting the patent granted otherwise than necessitated by the prior art.

I claim as my invention:

An accumulator cell construction of the class described comprising cell plates having a series of slots therein of uniform cross section, separator mats between the plates and detachable co-acting trapezoidal wedging members arranged within said slots and
5 interlocking in the cell plates to retain the same rigidly assembled and in spaced relation with one another.

In testimony whereof I have hereunto subscribed my name in the presence of two subscribing witnesses.

LEE J. PERRY.

Witnesses:
CHARLES W. HILLS, Jr.,
EARL M. HARDINE.